(12) United States Patent
Muller

(10) Patent No.: US 6,213,613 B1
(45) Date of Patent: Apr. 10, 2001

(54) ILLUMINATION APPARATUS FOR INSTRUMENT PANELS ESPECIALLY OF MOTOR VEHICLES

(75) Inventor: Rolf Muller, München (DE)

(73) Assignee: Papst Licensing GmbH & Co. KG (DE)

( * ) Notice: Subject to any disclaimer, the term of this patent is extended or adjusted under 35 U.S.C. 154(b) by 0 days.

(21) Appl. No.: 09/122,959

(22) Filed: Jul. 27, 1998

(30) Foreign Application Priority Data

Jul. 25, 1997 (DE) ................................................ 197 32 390

(51) Int. Cl.⁷ ..................................................... G01D 11/28
(52) U.S. Cl. ................................ 362/23; 362/29; 362/30; 362/84; 362/230; 362/231
(58) Field of Search ..................................... 362/23, 28, 29, 362/30, 293, 84, 230, 231, 489, 487, 488, 509, 510, 482, 85, 583; 372/108; 356/402

(56) References Cited

U.S. PATENT DOCUMENTS 5,321,718 * 6/1994 Waarts et al. .......................... 372/108
5,975,728 * 11/1999 Weyer .................................... 362/489
6,031,617 * 2/2000 Berg et al. ............................. 356/402

FOREIGN PATENT DOCUMENTS

| 37 04 574 A1 | 8/1987 | (DE) . |
| 197 32 390 A1 | 2/1999 | (DE) . |
| 2 743 534 | 1/1996 | (FR) . |
| 2 281 542 | 8/1994 | (GB) . |

* cited by examiner

Primary Examiner—Sandra O'Shea
Assistant Examiner—Bertrand Zeade
(74) Attorney, Agent, or Firm—Welsh & Katz, Ltd.

(57) ABSTRACT

Lighting device for instruments on a dashboard especially of motor vehicles with at least one light source for the at least partial illumination of the instruments of the dashboard in this manner that between the at least one light source and the instrument—fields which are to be illuminated at least one selective light filter which is transluceable for a shortwaved, blue spectral range and closes at least approximately the middle and long spectral range, is arranged.

9 Claims, 2 Drawing Sheets

ILLUMINATION APPARATUS FOR INSTRUMENT PANELS ESPECIALLY OF MOTOR VEHICLES

Figure 1:
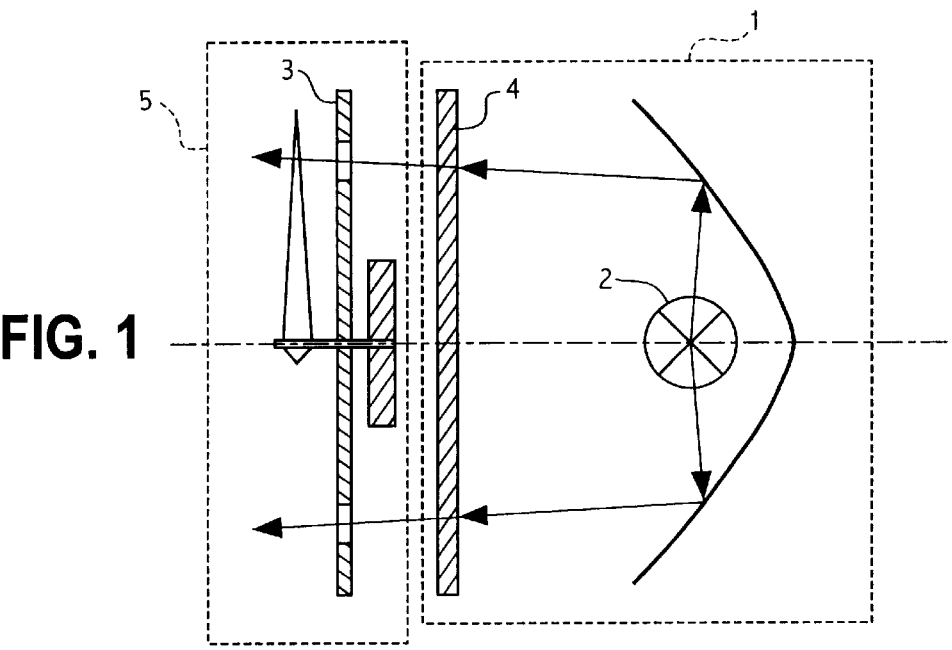

The invention concerns a lighting device for dashboard instruments in motor vehicles with at least one light source for the at least partial illumination of the dashboard instruments.

That kind of lighting devices are, for example, used in all motor vehicles for illuminating the dashboard instruments. For this the lighting device is always linked with a wiring installation which activates the headlights of the motor vehicle. As a result the dashboard illumination is activated concurrently with the switching on the headlights. The dashboard illumination can be done in very different ways. Thus with older types of motor vehicles one usually illuminates the dashboard with a light source emitting white light. With newer vehicles the individual digits and characters are already developed self-lighting, for example by appropriate light-emitting diodes), so that it is no longer necessary to lit up these digits and characters externally.

A problem with these well-known lighting installations of dashboards is the not optimal illumination or lighting of the dashboard. Certainly in some types of motor vehicles the dashboards are also already illuminated with orange or green light aside of the usual white light. An optimal reading of the dashboard instruments is however, not guaranteed with that.

As everybody knows the capacity of the human eye to focus automatically on different seeing distances, the so-called accommodation capacity diminishes with increasing age. From the 45th year up this deficiency becomes obvious so that for a sharp seeing in proximity one does need glasses. From the 50th year up even the normally healthy eye loses accommodation capacity as much that the unarmed dye only clearly discerns distant objects from about 2 m on, yet the closer ones more or less unsharply.

This deficiency is mainly irritating for older drivers who are able to see the more distant traffic events sharply but not he instruments of their dashboard because those is in relative small distance of about 70 to 80 cm in front of the eyes.

The described effect is mainly obstructing at darkness because then the pupils of eye dilate and with that the distance tolerance for sufficient sharp seeing is reduced.

The task ob of the invention is to create a simple possibility which the effect described above, that is the so-called old-age farsighting with the readability of the dashboard instruments at darkness, to suppress as far as to make possible a renouncement of additional optic remedies like glasses or magnifying glass lenses.

This problem is solved by a lighting device with the distinctive features of claim 1 or 2.

Further stages of the invention are subject of the sub-claims reconcerned to claims 1 and 2.

Thus, in conformity with the invention, in one realisation of the lighting device at least one selective light filter which is translucent for a short-wave ranged blue spectral range and which cuts off the middle and long spectral range at least approximately completely is inserted between the at least one light source and the instrument fields which are to be illuminated.

In conformity with another realisation of the invention the at least one light source emits nearly exclusively short-waved blue light. The solution of the problem consists in an illumination of the instruments by light with a spectral structure which contains, if possible, exclusively the visible range underneath of 55 m wavelength, preferably between 400 and 500 nm.

As everybody knows the human eye is, in the optical sense, an uncorrected system, comparable approximately with a simple convex lense. In particular the chromatic longitudinal defect is not adjusted so that the back focus of the eye is smaller for short waved light than for long waved light. Therefore the eye is a bit "myopic" in the short-waved spectral range, a bit farsighted in the long-waved spectral range. With normal seeing this effect is hardly noticable because the eye accomodates to a middle wavelength at full-range that is "white" lighting and does not discern the remaining occurrences of unsharpness with shorter and longer wavelengths. The effect however becomes plain if ones uses narrow banded lightings at the margins of the perceptible spectrum. If one selects e.g. on one side the wavelength range –600 nm (e.g. Schott—glass 5900, 2 mm) and on the other side in comparison one of –500 nm (e.g. Schott-glass BG 1, 2 mm) and calculates by means of the "theoretical eye" according to Gullstrand the always optimal focusing, then there results a difference of about 0, 6 to 0, 8 dpt, depending from the prioritization of the regarded wavelength range.

Applied on a dashboard illumination this means that with an orange illumination like it is usually used nowadays, glasses of about +0, 7 dpt would be necessary in order to come to an equal visual acuity which can be obtained without glasses when using blue light. For the presbyopic driver of a motor vehicle this means that he sees a blue-illuminated panel considerably sharper than an orange-illuminated one without glasses and namely in a way as if he wore glasses of about 0, 7 dpt. This refractive power is in fact not completely sufficient to make sharpseeing possible from a distance 70–80 cm when the accomodation ability is completely lost, but at least one can achieve an amelioration so clear that one can abstain from other seeing aids.

It may appear as a disadvantage of the proposed solution that blue light is subjectively perceived as relatively dark by the human eye. This is however only the case with the so-called "light-seeing". At darkness respectively at dask the sensibility of the eye for short wavelengths in contrast to long wavelenghts clearly increases so that at darkness blue is perceived relatively light. Moreover a possible lack of light intensity may, just as one likes, be levelled out by an intenser illumination that means by more powerful bulbs. Advantageously are in this context halogen bulbs because those have got beside of a larger general output of light also a better efficiency as conventional bulbs, especially in the shortwaved spectral range.

As filter for the selection of the desired shortwaved spectral field so-called "Kobald-glasses" are e.g., suitable, like, e.g. the Schott glasses BG1, BG3, BG25 or BG37, but also organic dyes in a plastic wrap may be used with benefit. In the simpliest case the dials and needles themselves may get an intensive blue colouring so that they too, with a broadband illumination appear to the observer as if they were illuminated by light with a shortwaved spectral field. In conformity to invention however an arrangement is to prefer where between the light source and the field to be illuminated a light filter is arranged.

Alternatively to a broadband bulb illumination with a light filter which lets pass only the shortwaved spetral field one may also use light diodes which radiate exclusively in the shortwaved spectral field. These can be used particularly for the direct presentation and/or illumination of digits and characters.

Figure 2:
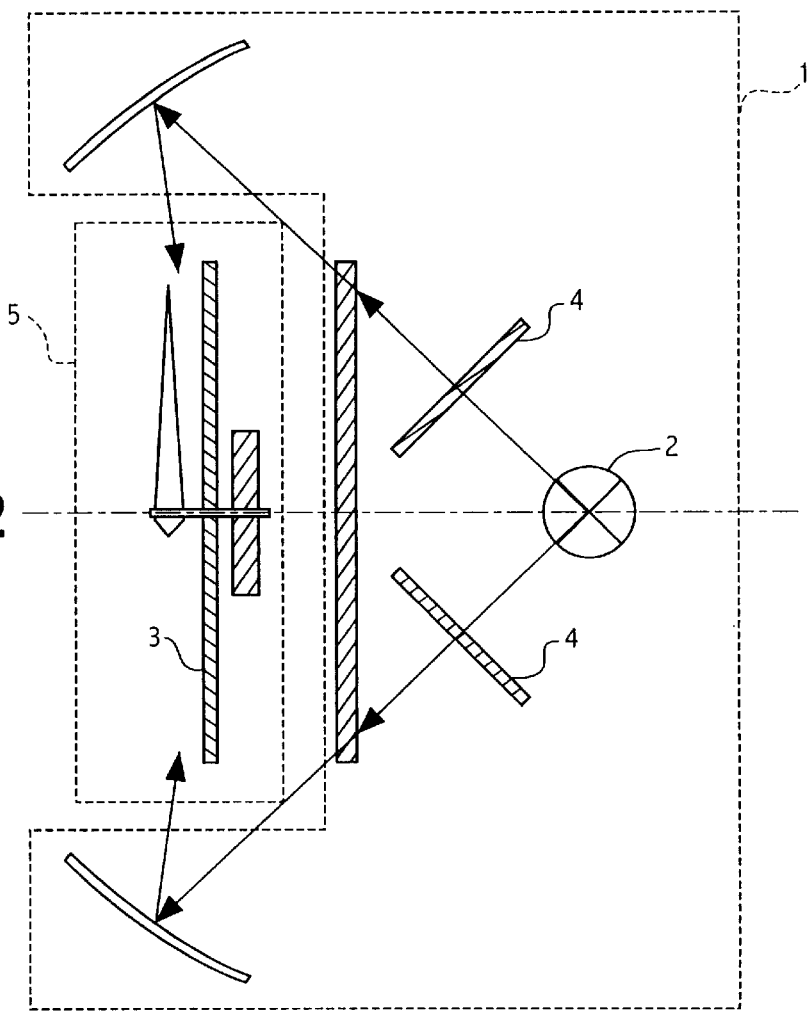

FIGS. 1 and 2 illustrate a lighting device 1 for a dashboard instrument panel 5. The lighting device 1 includes a light source 2, such as a bulb 2, and one or more of the selective light filters 4. The instrument panel 5 includes one or more instruments 3.

Figure 3:
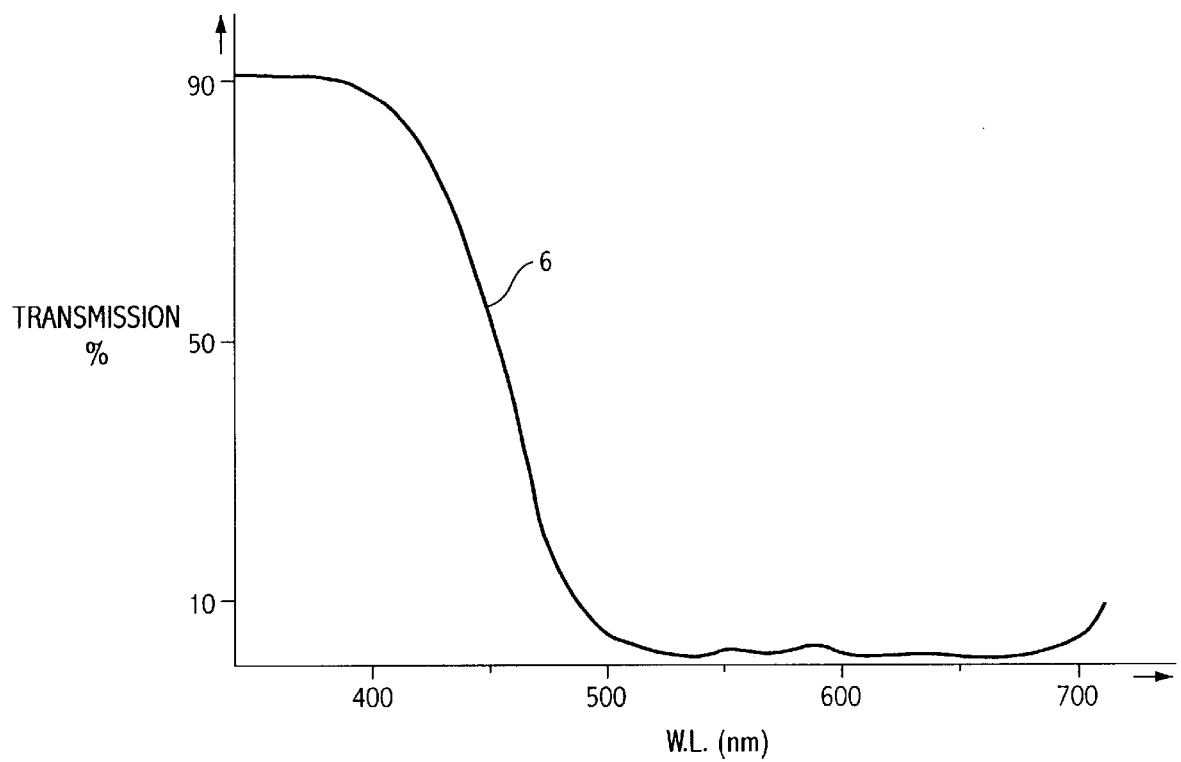

FIG. 3 illustrates, graphically, the percent transmission or translucence as a function of the light wave length in nanometers (nm) of the selective light filter, as shown by the line at 6.

What is claimed is:

1. A lighting device for instruments on a vehicle dashboard having instruments and having at least one light source for at least partial illumination of the instruments, comprising: at least one selective light filter intermediate the at least one light source and the instruments, the selective light filter transmitting a short-waved, blue spectral range and blocking out middle and long spectral range.

2. The lighting device in accordance with claim 1, wherein the at least one light source emits substantially only light in the short-waved, blue spectral range.

3. The lighting device in accordance with claim 1, wherein the light filter has a translucence at 400 nm wavelength of at least 50 percent and has a translucence at 500 nm of less than about 20 percent.

4. The lighting device in accordance with claim 1, wherein the light filter, in the wavelength range of about 530 to 670 nm has a translucence of less than about 5 percent.

5. The lighting device in accordance with claim 1 including at least one halogen electric light bulb for illuminating the instruments.

6. The lighting device in accordance with claim 1 including a gas discharging—lamp for illuminating the instruments.

7. The lighting device in accordance with claim 1, wherein the instrument fields are provided with a deep blue dye.

8. The lighting device in accordance with claim 7 wherein the instrument fields include an ultraviolet dye that is activated by light with a high UV-part.

9. A dashboard—instrument arrangement comprising self-shining digit characters formed by blue-shining light-emitting diodes.

* * * * *